United States Patent Office 3,649,469
Patented Mar. 14, 1972

3,649,469
PLANT FOR PRODUCING BOTH POWER AND PROCESS HEAT FOR THE DISTILLATION OF WATER
Robert Victor MacBeth, Bournemouth, England, assignor to United Kingdom Atomic Energy Authority, London, England
Filed May 22, 1968, Ser. No. 730,995
Claims priority, application Great Britain, May 22, 1967, 23,727/67
Int. Cl. B01d 3/06
U.S. Cl. 203—10      2 Claims

ABSTRACT OF THE DISCLOSURE

A plant for producing power by means of an expansion engine, the working fluid for which is such that a condensible constituent appears in the exhaust, has a heat exchanger in which the condensible constituent gives up its heat to a solution which forms the feed for a distillation means. The distillate is fed to expansion engine cycle so as to form a part of the working fluid.

BACKGROUND OF THE INVENTION

This invention relates to plant for producing both power and process heat for use in a process plant.

SUMMARY OF THE INVENTION

Up to the present many proposals for power cycles have been made to burn fuel in the presence of air whilst water is injected into the cycle at some point, the combustion effluent being expanded down to atmospheric pressure in an expansion engine producing useful work. The net thermal efficiency with a plant of this nature may be as high as 35%. These proposals require a supply of injection water substantially free of impurities if the cycle components, especially the turbines, are to be unharmed.

Broadly the present invention provides a plant for producing power in an expansion engine from the expansion of combustion products derived from a combustion zone into which water is introduced along with fuel and air, the engine exhaust being directed to the heat input section of the process plant yielding distilled water as a product or a by-product a metered quantity of which is fed to the combustion zone.

More specifically, the present invention provides a dual purpose plant producing both power and high purity water by distillation of an aqueous solution, said plant comprising a pressurized combustion chamber in which fuel is burnt with near stoichiometric amount of air in the presence of water, a turbine or other expansion engine in which the combustion chamber effluent is expanded to a pressure above the dew point of the vapour constituent of its exhaust, a distillation plant connected to receive said exhaust and arranged to effect heat exchange between the aqueous solution and the exhaust wherein a major proportion of the steam content of the exhaust is condensed.

The quantity of high purity water produced can be just sufficient to meet the internal requirements of the cycle or it can supply in addition a large external demand for fresh water.

The invention thus constitutes a power cycle in which both power and high purity water are produced characterized in that exhaust steam from the power cycle has a high dew point so that a major proportion of the rejected heat from the cycle is available as latent heat for heat transfer purposes in the distillation plant. This mode of operation is not applicable in a conventional gas turbine plant whose exhaust gases have a low dew point and heat transfer between the exhaust and the aqueous solution has to rely (certainly over the most useful, higher temperature, range) upon the much less favourable performance of gaseous heat transfer. Neither is this mode of operation applicable to the Rankine Cycle unless the latter be modified in a manner which reduces its thermal efficiency.

DESCRIPTION OF THE PREFERRED EMBODIMENT

Figure 1:
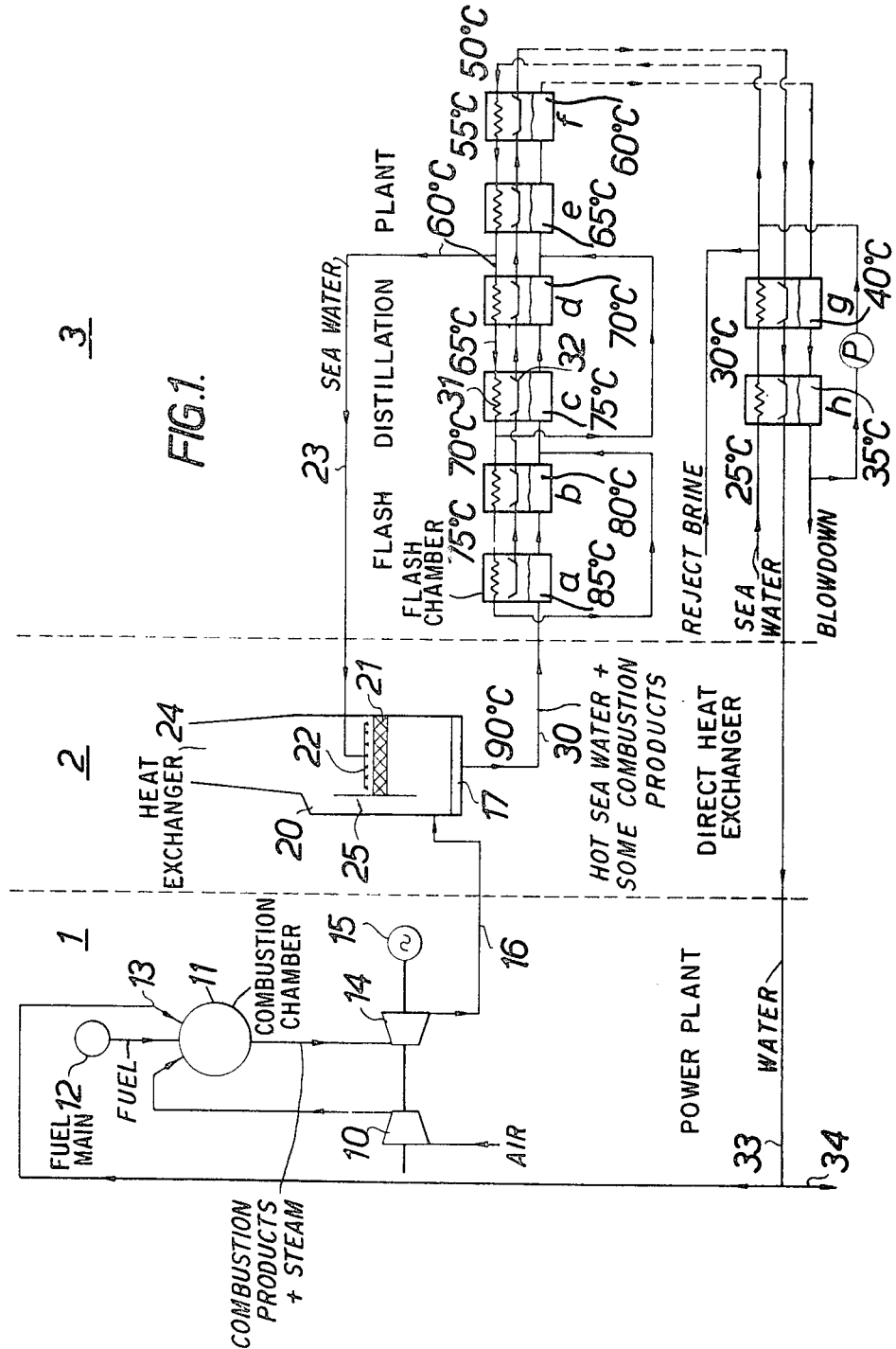
FIG. 1 shows diagrammatically a plant producing power from turbines and distilled water from brine by flash distillation and FIG. 2 shows a heat transfer diagram.

The dual plant comprises essentially a so-called internal combustion steam turbine cycle 1 (I.C.S.T.) from which the exhaust is employed as a source of process heat in the heat input section 2 of a flash distillation cycle 3.

The main plant components of the cycle 1 shown include an air compressor 10 compressing atmospheric air and delivering compressed air to a combustion chamber 11. Into the later is injected gaseous or liquid fuel, from a main 12, at a rate such that the fuel and air burn in substantially stoichiometric proportions and, also, water from pipe 13. The water serves for cooling the combustion chamber surfaces and for the generation of superheated steam in the chamber. The effluent from the chamber 11 which is a steam/gas mixture is passed to axial flow turbine 14 coupled to drive the compressor 10 and an alternator 15.

The turbine 14 exhausts steam gas mixture at about 140° C. by way of duct 16 which leads the mixture to the heat input section 2 of the flash distillation plant 3 for distilling brine. The section 2 is essentially a heat exchanger for transferring heat from the mixture to the brine and, in the preferred form shown, this is a direct contact heat exchanger 20 having a packed bed 21 which is continuously sprayed with brine from distributor 22 fed from a pipe 23. The exhaust steam enters the heat exchanger from below the packed bed 21 and is quickly reduced to an initial dew point whereupon the steam starts to condense and in so doing gives up a substantial quantity of heat to the brine perculating through the bed. Uncondensed vapours and gases leave the heat exchanger by stack 24. A bypass 25 is provided so that if necessary a proportion of steam/gas mixture in duct 16 can bypass the packed bed and be directed to the stack.

Figure 2:
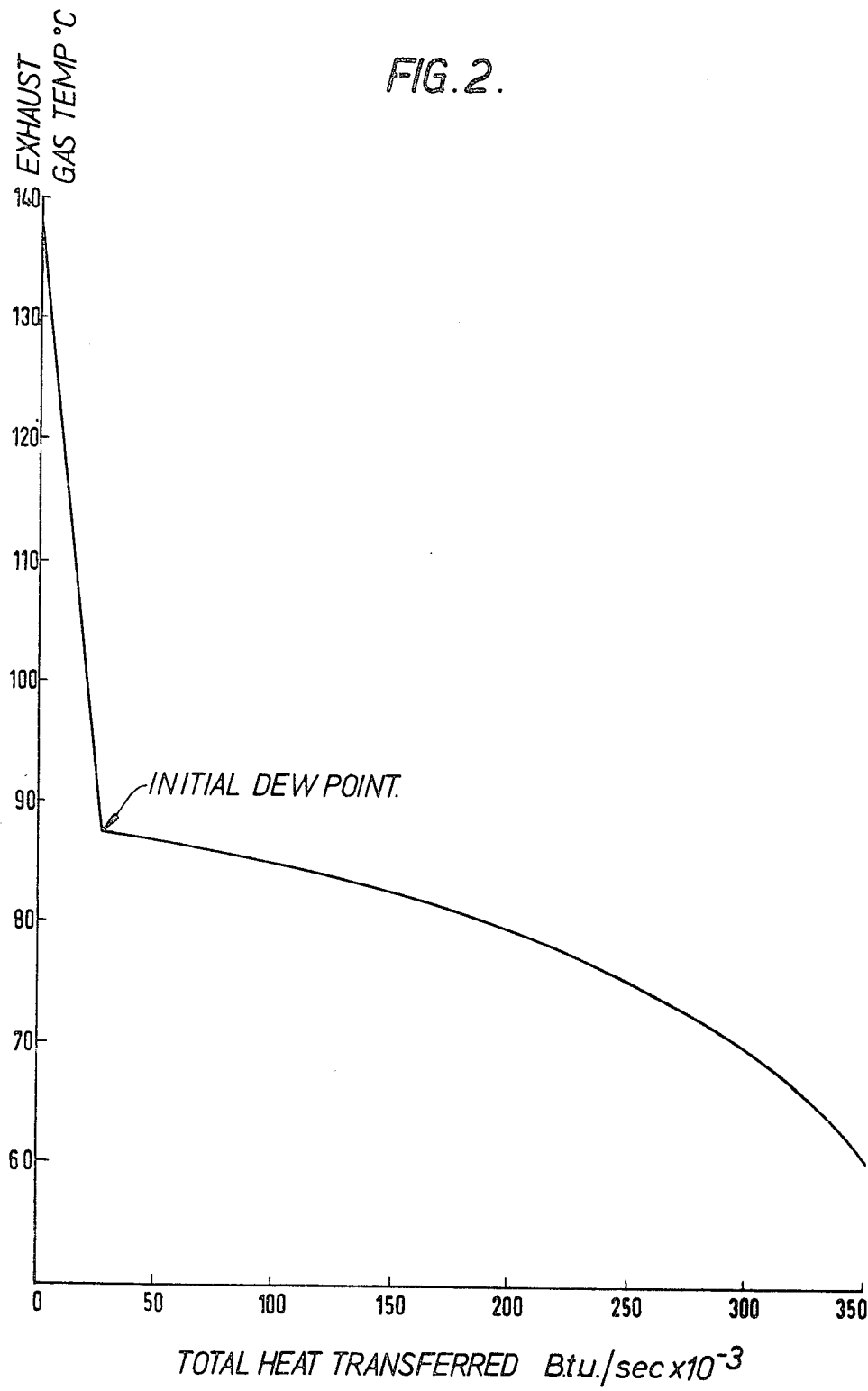

FIG. 2 shows the heat transfer diagram for the cooling of the exhaust gases from typically a 200 mw.(e) cycle 1 with the combustion chamber 11 working pressure of 100 atmospheres and burning natural gas. It can be seen from FIG. 2 that the temperature of the exhaust gases falls as condensation proceeds on account of the reduction in partial pressure of the water vapour.

The heated brine and condensate drain into a well 17 at the base of the heat exchanger and provides a reservoir of hot feed material for the distillation plant 3 in this example of a flash distillation plant.

A pipe 30 leads the hot brine from the well 17 into the first chamber $a$ of a series of flash chambers $a$–$h$ of the flash distillation plant 3. The flash chambers are connected in series in conventional manner and are shown diagrammatically here in order to allow indicia indicating specimen temperatures in ° C. to be more easily inserted and for the sundry pipe connections to be shown with clarity.

In this distillation plant, the heated brine flows through the series of chambers at progressively lower pressure $a$–$h$ separated by suitable weirs, whilst raw brine flows through condenser tubes 31 in counter flow. As a preparation of the brine flashes into steam in each chamber so the steam condensed on the tubes 31, carrying cool brine, runs off the tube surface to a collection tray 32 whence it is run to a distilled water main 33. From this water main 33 a metered quantity of water is supplied to the combustion chamber via pipe 13 and the residue is piped out for utilization via pipe 34.

As will be seen from FIG. 1 the brine supplied to the heat input section 2 is a bleed drawn from between flash chambers $d$ and $e$ where the temperature is about 60° C., i.e. below the dew point of the exhaust steam in the heat exchanger. The heated brine is pumped back to the flash tank in chamber $a$. In this way a higher circulation rate can be maintained through the flash chambers than through the heat exchanger itself, for example, up to three times higher.

The bypass passage 25 is preferably maintained partially open during operation so that a continuous bleed of hot steam/gas mixture is passed to the stack. In this way dry conditions in the stack are maintained as far as possible.

To increase water to power ratios in any dual purpose system means reducing the power plant thermal efficiency and with the (I.C.S.T.) cycle 1 this can be done by three methods:

(1) by reducing the combustion chamber pressure;
(2) by injecting more water into the combustion chamber and so lowering the turbine inlet temperature;
(3) by exhausting from the turbine to the brine heater at a pressure above atmosphere.

An optimisation would be necessary for any particular design, but it is evident that the I.C.S.T. cycle offers considerable flexibility when applied to dual purpose systems, including flexibility of a given design of plant to operate with widely varying water output/power output ratios.

Thus although the general form of the distillation plant is a conventional one, the particular method of coupling the plant to the heat input section shown in FIG. 1 is thought to be advantageous, in this instance, due to the variations in temperature of the heating fluid in the heat input section. Reference to FIG. 2 shows that a steam/gas mixture exhausted from the final turbine at a temperature of about 138° C. will, on cooling have an initial dew point of about 90° C. and that the bulk of the available heat content then becomes available during subsequent cooling as the partial pressure of the remaining vapour falls and, with it, the dew point. To take advantage of the very large quantity of available low grade heat, brine for heating is extracted, not from the highest pressure stage of the flash plant, but from an interstage point where the temperature of the brine in the condenser tubes is a little below that temperature which it is ultimately required to cool the exhaust in order to extract the major portion of the heat available. In this case 60° C. is an appropriate temperature. Thus, in the example, one-third of the total brine flowing between stages $d$ and $e$ being at a temperature of about 60° C. is pumped to the heat exchanger.

A second third of the total brine flow as aforesaid is withdrawn from between stages $b$ and $c$ leaving the remaining third to flow through condenser tubes of stages $a$ and $b$. The flow through these latter condenser tubes is balanced by the heated one-third of brine from the well 17 which passes through the flash tanks of stages $a$ and $b$ successively. At the entry to the flash tank of stage $c$ the brine from the stage $b$ flash tank is joined by the brine from the condenser tubes of the first stage $a$ so that two-thirds of the total flow enters the flash tank of stage $c$ thus balancing the two-thirds of the flow in condenser tubes of stage $c$ and then stage $d$. The said second third of the condenser brine is fed to the flash tank of stage $c$ to preserve balanced conditions in that stage which passes full flow in both condenser tubes and flash tanks.

Although in the above example one-third is the fraction of the total flow selected for heating, this fraction can be any value according to the desired arrangement; complementary adjustments being made to balance the flows.

The method of putting heat into brine in a desalination plant described above is usable independently of the I.C.S.T. cycle and may be applied to any circumstance where the transfer of heat to the brine in the heat input section is effected at other constant temperature.

I claim:

1. A process for the production of power and process heat for use in a distillation plant comprising the steps of producing a hot elastic fluid containing a substantial condensible fraction by the combustion of fuel and air in the presence of water, passing the fluid through an expansion turbine to produce power, extracting the fluid from the turbine at a temperature above the dew point of the condensible fraction of the fluid, bringing the extracted fluid into direct contact heat exchange with raw water to heat that water prior to its distillation, the water being heated by heat in the form of both latent heat from the condensible fraction of the extracted fluid and sensible heat from the non-condensible fraction of the extracted fluid, and then distilling the heated water to produce pure product water.

2. A process as claimed in claim 1 further including the step of utilizing the distilled product water for the production of said elastic fluid.

References Cited

UNITED STATES PATENTS

| | | | |
|---|---|---|---|
| 1,230,417 | 6/1917 | Lillie | 60—39.55 |
| 2,781,635 | 2/1957 | Brogdon | 60—39.55 |
| 3,038,308 | 6/1962 | Fuller | 60—39.55 |
| 3,165,452 | 1/1965 | Williams | 202—173 |
| 3,326,778 | 6/1967 | Mock | 203—100 |
| 3,334,024 | 8/1967 | Zahavi | 202—173 |
| 3,335,565 | 8/1967 | Aguet | 60—39.55 |
| 3,351,537 | 11/1967 | Peterson | 203—49 |
| 3,356,591 | 12/1967 | Peterson | 203—49 |
| 3,376,204 | 4/1968 | Tidball | 202—173 |
| 3,396,086 | 8/1968 | Starmer | 202—173 |
| 3,467,587 | 9/1969 | Connell et al. | 202—173 |

FOREIGN PATENTS

| | | |
|---|---|---|
| 1,025,921 | 4/1966 | Great Britain. |
| 1,025,922 | 4/1966 | Great Britain. |

WILBUR L. BASCOMB, Jr., Primary Examiner

U.S. Cl. X.R.

203—100, DIG 8, DIG 16, DIG 17, DIG 20; 202—173; 60—39.05, 3955